United States Patent Office 3,315,445
Patented Apr. 25, 1967

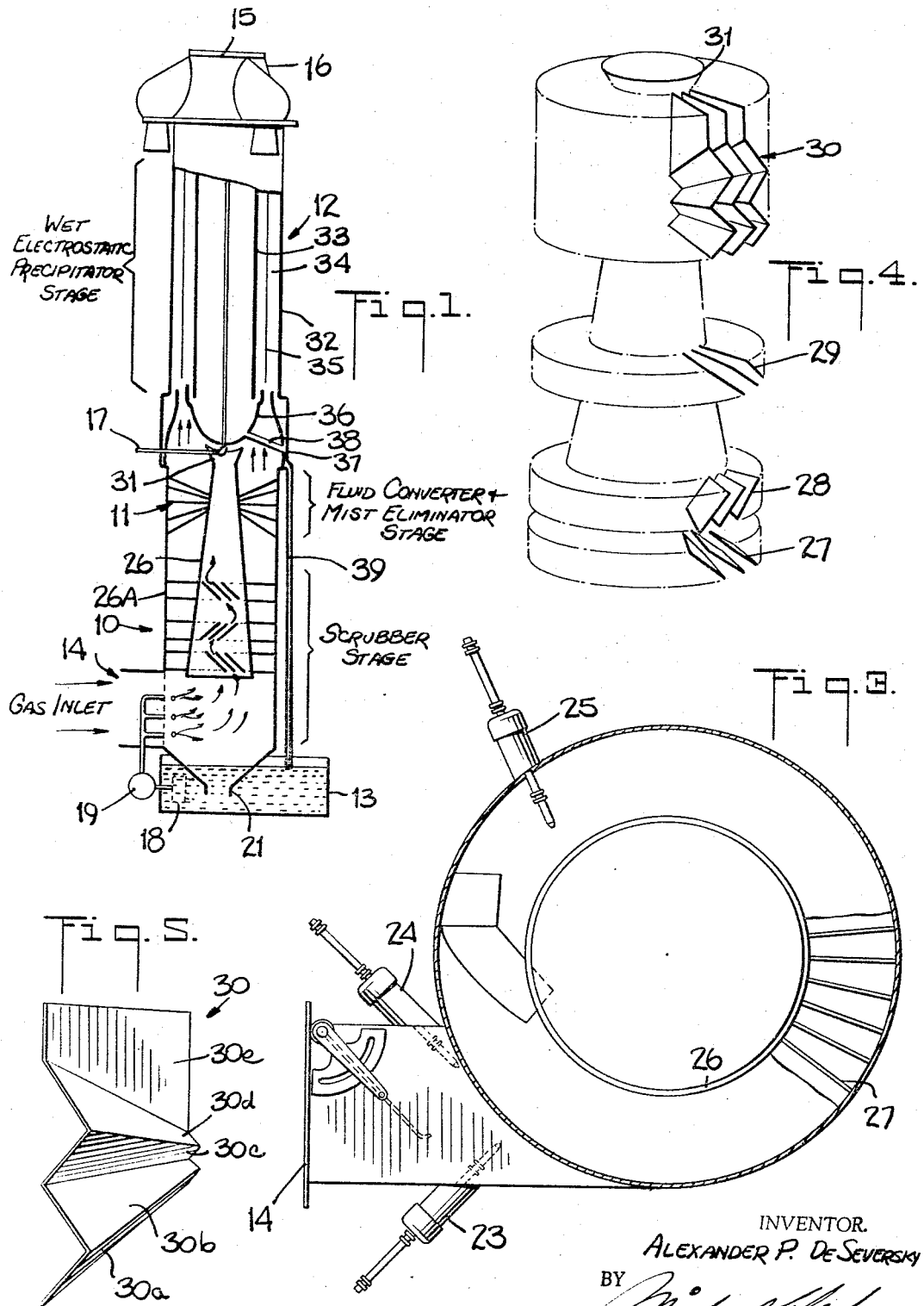

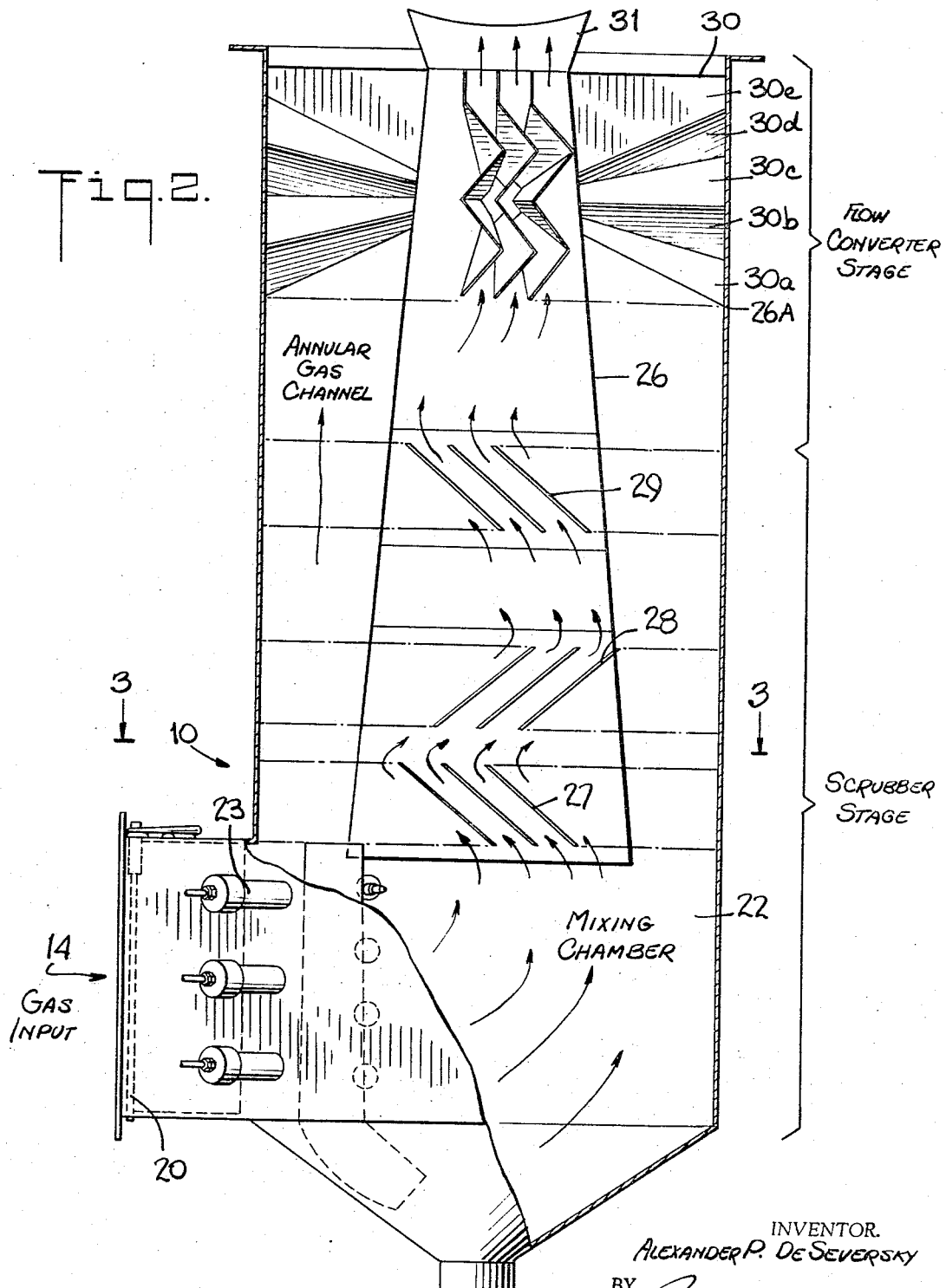

3,315,445
INTEGRATED POLLUTION CONTROL SYSTEM
Alexander P. de Seversky, Northport, N.Y., assignor to Electronatom Corporation, New York, N.Y., a corporation of New York
Filed Nov. 15, 1965, Ser. No. 507,826
5 Claims. (Cl. 55—122)

This application is a continuation-in-part of my copending application Ser. No. 364,143, filed May 1, 1964.

This invention relates generally to pollution control systems for purifying a contaminated gaseous stream, and more particularly to an integrated precipitator unit having scrubber, mist-eliminator, flow-converting and electrostatic stages in cascade relation, adapted to remove all impurities from the stream passing therethrough, without regard to the particle size or nature of the impurities, whether solid or gaseous.

In my Patents 2,937,709 and 3,053,029, there are disclosed wet electrostatic precipitators whose collecting surfaces are constituted by uniform films of water which flow away the particles precipitated thereon. Wet precipitators are more efficient than standard scrubbers with respect to fine particles suspended in the gas stream. For while large particles are also ionized in the electrostatic field, their magration velocity is usually so low that they tend to be swept out by the gas stream before reaching the collecting surfaces.

Similarly, extremely small particles also can be swept away unless the treatment time, which is inversely proportional to the gas velocity and directly proportional to the length of the collecting electrodes, is extended. However, because of bulk and size requirements, an electrostatic precipitator structure whose treatment time will bring about precipitation of the entire spectrum of particles, is commercially impractical.

In contradistinction to electrostatic precipitators, scrubbers of conventional design act more effectively in removing coarse rather than fine particles from a contaminated gas stream passing therethrough. In scrubbing, water or other liquid is brought into contact with the impure gas. Commercially available equipment for this purpose makes use of flooded or floating beds and a maze of staggered slots, baffle plates, or fine screens, which are wetted to cause particles impinging thereon to be retained by the water film. But such expedients tend to clog quickly and to impede the passage of the gaseous medium being decontaminated. With special scrubber designs, it is possible to remove fine as well as coarse particles, but the initial cost of such scrubbers and their operating costs are very high, hence the use of such scrubbers is not economically feasible.

Logically, to remove both coarse and fine particles with practical efficiency, one should connect a scrubber in series with an electrostatic precipitator, the former serving to remove coarse particles from the stream, and the latter to remove the remaining fine particles, thereby purifying the stream. This series combination, however logical, is nevertheless highly inefficient and cumbersome.

To begin with, elaborate and costly duct work is ordinarily necessary to convey the impure gas through the scrubber and through the precipitator. Moreover, since in scrubbing, the gaseous stream is rendered turbulent in order to thoroughly intermingle the water and gas, the gas emerges from the scrubber in a stream whose velocity profile is highly uneven. On the other hand, the electrostatic precipitator operates efficiently only if the incoming gas has a laminar flow characteristic and a uniform velocity profile.

Thus, gas flow disturbances introduced in cyclonic or other turbulent scrubbing actions militate against effective electrostatic precipitation if the output of a scrubber is fed directly into the input of the electrostatic precipitator. Alternatively, if the feed from the scrubber to the precipitator is through an extended duct to reduce turbulence, then the system becomes cumbersome.

In view of the foregoing, it is the main object of the invention to provide a pollution control system in which scrubber and wet electrostatic precipitator stages are intercoupled compatibly in cascade relation, whereby coarse particles are removed in the scrubber stage and fine particles are removed in the precipitator stage, the stages acting with optimum efficiency to extract the full spectrum of contaminants from the stream.

More specifically, the object of the invention is to provide an integrated pollution control unit which is practical, efficient and compact, and which combines a hydrocyclonic scrubber stage with a wet electrostatic precipitator stage in an integrated system devoid of duct work and capable of operating reliably and inexpensively for prolonged periods without attention.

A significant feature of the invention resides in the use of a mist-eliminator stage which functions also as a flow converter for intercoupling the scrubber and precipitator stages, whereby the moisture-laden and turbulent gas stream emerging from the scrubber is processed to enter the electrostatic precipitator stage in a mist-free laminar stream, thereby optimizing the aerodynamic coupling between the scrubber and precipitator stages.

The scrubber stage, in accordance with the invention, is an open structure with negligible internal drag, its effective range of filtration starting with particles of about 10 to 20 micron size and extending to the larger particle sizes. The electrostatic precipitator stage is matched to the scrubber stage, for it is more effective in precipitating fine particles, its range of filtration leveling off at about 10 to 20 microns. Hence the filtration curves of the two stages cross over at about 10 to 20 microns, and the two stages thereby act synergistically to encompass the full spectrum of pollutants.

Still another object of the invention is to provide an integrated system wherein the wet electrostatic stage is mounted above the hydrocyclonic scrubbing stage, with the mist-eliminator flow-converting stage being interposed therebetween, the electrostatic precipitator stage being constituted by an annular gas passage whose collector walls are continuously washed, the mist-eliminator and scrubber stages therebelow also having annular gas passages, thereby avoiding discontinuities in the flow path extending through the three stages forming the unit.

Because the integrated system in accordance with the invention is composed of non-clogging scrubber and mist-eliminator stages, as well as a self-cleaning wet-precipitator stage, very little if any maintenance is required, and the compact, integrated structure may be readily installed on the roof of a building to eliminate smoke and particulates from flue gases at the exhaust of an incinerator, a furnace, or any other source of pollution. The system is entirely self-cleaning, operating automatically and continuously at peak efficiency, thus minimizing down-time and labor requirements.

Briefly stated, these objects are accomplished in an integrated, synergistic system constituted by a hydrocyclonic scrubber stage, a mist-eliminator stage, and a wet electrostatic precipitator stage, the three stages being disposed in cascade relation one above the other to form a unitary tower, the stages each having an annular gas passage to provide a low-drag gas passage extending from the base to the top of the tower. The reduction in drag or pressure differential achieved by the invention is not at the expense of efficiency, for little energy is dissipated in creating non-productive turbulence.

A contaminated gas stream sucked into the scrubber stage at the base of the system, is caused to intermingle with jets of water and is rendered cyclonic and turbulent in character. The wetting of the particles in the scrubber causes extremely minute particles to agglomerate into particles of a size more conducive to precipitation. The wet turbulent stream passes through several decks of reversely-inclined stator plates which impart a cyclonic motion to the stream, first in one direction and then in the reverse direction, the resultant centrifugal action causing the larger particles in the stream to impinge on the stator plates, from which they drain into a tank.

The moisture-laden and eddying stream carrying the fine particles and the agglomerated minute particles then flows through the mist-eliminator and flow-converting stage, which is constituted by an annular array of radially-extending, pleated vanes terminating in planar fins, the vanes being disposed in the annular gas passage and serving not only to remove the moisture from the stream, but also to collimate the stream and render it laminar with a uniform velocity profile. The laminar stream is finally conveyed through the annular passage in the wet precipitator, which removes the fine and the agglomerated particles therefrom, the purified stream emerging from the top of the system. Thus the integrated system functions to remove the entire spectrum of contaminants from the stream.

For a better understanding of the invention, as well as other objects and further features thereof, reference is made to the following detailed description to be read in conjunction with the accompanying drawings, wherein like elements in the several figures are designated by like reference numerals.

In the drawings:

FIG. 1 schematically illustrates a three-stage integrated pollution-control unit in accordance with the invention;

FIG. 2 is a vertical section taken through the hydrocyclonic scrubber and the mist-eliminator stage of the unit;

FIG. 3 is a transverse section taken through the plane indicated by line 3—3 in FIG. 2, showing the details of the scrubber stage;

FIG. 4 is a perspective view showing the baffle plates in the scrubber stage and the vanes in the mist-eliminator stage; and FIG. 5 is a separate perspective view of one of the vanes in the mist-eliminator stage.

THE GENERAL ASSEMBLY

Referring now to the drawings, and more particularly to FIG. 1, there is shown a unitized pollution control system essentially constituted by three stages in cascade relation, namely a hydrocyclonic scrubber stage, generally designated by numeral 10, a mist-eliminator flow-converting stage 11, and a wet electrostatic precipitator stage 12. The three stages or sub-assemblies are mounted vertically one above the other, over a recirculating water tank 13 which rests on the floor. The three stages are joined together within a cylindrical casing to form a unitary tower whose height and other dimensions will depend on the capacity of the system.

Because of its compact structure, the pollution control tower is adaptable to a wide variety of applications. It may be used, for example, for residential pollution control, and may readily be installed on roofs of existing buildings where modifications of present incinerators are physically difficult to accomplish or prohibitive in cost. When so used, the system is capable of virtually eliminating particulate emission as well as liquid soluble gases from apartment house incinerators.

The system is also usable for the filtration of dangerous radioactive particles from military and other installations, for the control of dust, bacteria and pollen in industrial "white rooms," or in hospitals, for the control of smoke and soot in the stacks of seagoing vessels, and in the stacks of commercial and industrial plants. The tower structure may be scaled in accordance with the needs of a particular installation. The system may also be used in chemical or industrial plants to recover valuable effluents.

Impurity-laden gas is drawn by a blower (not shown) at high velocity into the pollution control tower through a lateral gas inlet 14 at the base of the tower where it enters the water mixing chamber of the scrubber stage 10, and after passing successively through the stages 11 and 12, and being purified, it is discharged through a gas outlet 15 in the exhaust hood 16 at the top of the tower. Since the gas is no longer polluted, it may in practice be discharged directly into the atmosphere, for there is no need for a high stack to disperse the pollutants.

A common supply of water for the wet precipitator stage and the scrubber stage is fed into the system through inlet pipe 17, the water drained from these stages flowing into the recirculating water tank 13, where it is filtered by a filter element 18 before entering the recirculating water pump 19, which acts to pump the filtered water back into the precipitator and scrubber stages.

THE SCRUBBER STAGE

Referring now to FIGS. 2 and 3, which show the hydrocyclonic scrubber stage in greater detail, the polluted gas sucked through inlet 14 is admitted through an adjustable control gate 20 into a mixing chamber 22 whose bottom is in the form of a funnel 21 which dumps the dirty water into tank 13. The incoming impurity-laden gas in introduced tangentially into the scrubber and is subjected to high-velocity water jets emitted from two banks 23 and 24 of jet nozzles, the nozzle banks being oriented to produce intersecting jet curtains of water, thereby dynamically intermingling the gas with the water with a high degree of turbulence in order to entrap the larger particles and to effect their precipitation. The tangential swirl of gas in chamber 22 is further acted upon by a third bank of water jets 25, and a considerable amount of toxic gas resulting from combustion is also absorbed by the water.

Because of the manner in which the gas is introduced tangentially into the chamber, a cyclonic motion is imparted to the upwardly drawn gas as it travels through the annular passage defined between a tubular core member 26 in the form of a truncated cone supported concentrically within the tower above chamber 22 and an outer casing 26A.

Mounted on the core member 26 at vertically spaced positions thereon are three rings of stator plates 27, 28 and 29, each ring being constituted by a series of circumferentially-arranged spaced plates supported on a collar encircling the core member. It will be noted that the plates in each ring are inclined with respect to the vertical, and that the inclination of the plates in ring 28 with respect to the vertical is the reverse of that ring 27, and that of ring 29 is the reverse of that in ring 28.

Consequently, the water-soaked particles in the gas stream, which is drawn upwardly into the annular passage surrounding core 26, first impinges on the stator plates 27, the larger particles tending to adhere to the water film thereon, after which the gas stream which has been diverted from the vertical by the plates on ring 27, then reverses direction for passage through the plates of ring 28, where again, particles impinging on these plates tend to adhere to the water film thereon, this process being repeated with the plates on ring 29.

The angle of the stator plates in the three decks is increased progressively in order to slow down the cyclonic action of the gas preparatory to its entry into the mist-eliminator stage. For example, in practice, the angle of the plates in the first deck may be 30° from the vertical, the angle of the plates in the second deck may be 40° in the reverse direction, and that of the third deck 50°, again in the reverse direction. Of course, in practice, depending on the requirements of the system, more than three decks may be used.

Thus in passing through the devious path defined by the three decks of rings formed by inclined stator plates, the larger particles in the water-intermingled gas stream, by reason of centrifugal action, impinge on and are collected on the wet stator plates and drip down funnel 21 into the settling tank 13. As pointed out previously, the scrubber is not too effective with respect to fine and minute particle sizes. However, the wetting action causes the minute particles to agglomerate into particle sizes better suited for subsequent electrostatic precipitation. The gas emerging from the uppermost set 29 not only still contains the finer particles which resist entrapment by the stator plates, but the stream, which is highly turbulent, also has a high moisture content.

THE MIST-ELIMINATOR STAGE

Before the turbulent gas stream from the scrubber is permitted to enter the electrostatic precipitator stage 12 it is necessary for reasons of operating efficiency to transform the flow pattern thereof from a cyclonic or turbulent motion having an uneven velocity profile, to a collimated or straight-line, laminar flow having a uniform velocity profile. It is also important that mist or droplets be prevented from entering the electrostatic field in the wet precipitator stage where they would interfere with the electrostatic action therein in that they would tend to cause deleterious arcing in the high voltage field.

To accomplish this result, the mist-eliminator flow-converting stage 12 is constituted by an annular array of radially-extending vanes 30. Each vane, as best seen in FIG. 5, is constituted by four wedge-shaped pleated sections 30a, 30b, 30c and 30d, having a zig-zag configuration, terminating in a vertical fin 30e. In practice, the number of zig-zags will depend on air flow requirements, the four sections shown being merely by way of example.

Inasmuch as the vanes are radially disposed with respect to the central core 26 in the annular passage defined between the core and the outer casing 26A, to prevent the gap therebetween from increasing from the core position to the casing position, the pleated sections are made wedge-shaped and hence taper inwardly in the direction of the core. Thus the angle of inclination of the pleat then becomes more acute in the direction of the casing to maintain the desired gap size. This is necessary in order to prevent a straight through-flow of gas, for if mist is to be eliminated it is important that the gas be constrained to strike the surfaces of the pleated sections of the vanes.

Thus the moisture-laden gas stream drawn upwardly through the stage 12 is forced to travel through the zig-zag passages defined between the pleat sections 30a to 30d of the vanes, and the moisture particles striking the pleat sections are caused to precipitate thereon to remove moisture. The radial passages formed between the vertical fin sections 30e are strictly vertical and tend, therefore, to collimate the stream.

As is well known in aerodynamics, the behavior of a flowing fluid is the result of the physical and geometrical conditions in the flow passage as well as the intrinsic properties of the fluid. Flow in a straight passage is rendered laminar if the Reynolds number, which is the ratio of inertial force to viscosity, is below 2200. Transition to turbulent or eddy motion flow occurs when this ratio value exceeds 2200. Hence the fins in the second stage are so spaced as to produce straight-line passages in the vertical direction, the passage dimension being such with respect to the fluid velocity as to convert the eddying motions occurring in the zig-zag passages in the pleated sections therebelow into laminar flow.

THE PRECIPITATOR STAGE

The electrostatic precipitator is preferably of the type disclosed in my copending application entitled, "Self-Decontaminating Electrostatic Precipitator Structures," Ser. No. 222,009, filed Sept. 2, 1962, and comprises an outer collector tube 32 and an inner collector tube 33 supported therein to define an annular gas channel 34. Concentrically disposed with the gas channel is a circular discharge electrode structure 25. Water is caused to flow down the inner collector tube 33 into a cup-shaped sump 36 disposed below the lower end of this tube, and water from the outer collector tube 32 flows into an annular trough 37. The water collected in sump 36 flows through pipe 38 into trough 37, from which it is drained through duct 39 into the tank 13. An electrostatic field is established between the discharge electrode 35 and the water films flowing on the walls of the collector tubes, whereby particles in the gas stream in the annular channel 34 are caused to migrate toward the water films and are washed thereby down the collector walls.

It will be noted that the core member 26 is a truncated cone which acts to progressively increase the effective cross-sectional dimensions of the annular gas passage as it extends upwardly in the direction of the electrostatic precipitator stage. Thus the gas expands in its upward passage to facilitate the conversion of the flow pattern from turbulent to laminar, for the less constricted the passage, the slower the gas velocity and the lesser the tendency toward turbulence.

A matching core section 31 is interposed between the top of core 26 and the bottom of sump 36, the core section 31 being shaped to provide a smooth transition between the widened annular gas passage at the top of the core 26 and the relatively constricted annular gas passage at the bottom of the electrostatic precipitator.

This constricted passage provides a venturi action, which causes the expanding gas emerging from the venturi region to force the water film against the collector walls, thereby to maintain a smooth and uniform flow without separation therefrom in the form of droplets that might cause high voltage shorting.

Thus, particle extraction begins in the scrubber stage, where the gas is rendered turbulent and large particles are removed and minute particles are agglomerated, and is completed in the electrostatic precipitator stage where the gas flow is laminar and the fine particles and the agglomerated particles are removed. The particle-extraction response of the scrubber stage begins effectively with particles above 10 to 20 microns in size, and continues into the large particle range, whereas the response of the electrostatic precipitator is effective for fine particles up to 10 to 20 microns and thereafter tapers off. The response curves of the two active stages cross over at about 10 to 20 microns, and the synergistic combination of these stages is such that the full spectrum of particles is covered, and the gas is entirely decontaminated.

While there has been shown and described a preferred embodiment of integrated pollution control system in accordance with my invention, it will be appreciated that many changes and modifications may be made therein without, however, departing from the essential spirit of the invention as defined in the annexed claims.

What I claim is:

1. An integrated system for removing both fine and coarse particles from a contaminated gaseous medium, said system comprising:
   A. a hydrodynamic section for extracting coarse particles from said contaminated gaseous medium and including,
      (a) a chamber having an input and an output,
      (b) means introducing said contaminated gaseous medium into said input to produce a cyclonic motion of said medium in said chamber, and
      (c) means subjecting the gaseous medium in said chamber to high-velocity jets of water to effect intermingling of said water and said medium to entrap said coarse particles and causing said medium to emerge from the output of said chamber in a wet, turbulent state, B. an electrostatic precipitator section for extracting fine particles from said medium and including,
   (a) collector and discharge electrodes disposed in spaced relation to define a flow passage therebetween having an input and an output,
   (b) means to apply a high voltage between said collector and discharge electrodes to produce an electrostatic field therebetween extending transversely with respect to the longitudinal axis of said flow passage, and C. an aerodynamic flow converter section coupling the output of said chamber to the input of said flow passage, said converter section comprising an array of vanes, each having,
   (a) a first portion formed by a series of pleats defining a plurality of zig-zag conduits dividing the wet turbulent gaseous medium emerging from the output of said chamber into moisture-laden gaseous streams which impinge on said pleats to cause the moisture therein to adhere thereto whereby the streams leaving said zig-zag conduits are in a relatively dry condition to minimize arcing in said electrostatic field when the medium is acted upon in the flow passage of the electrostatic precipitator section, and
   (b) a second and planar portion defining a plurality of substantially unobstructed conduits in registration with said zig-zag conduits to convert the dry gaseous streams therefrom into laminae extending in planes parallel to the longitudinal axis of said flow passage and causing the dry medium entering said flow passage to assume a laminar form whereby electrostatic precipitation is effected therein with optimum efficiency and said medium passes out of the output of said flow passage in decontaminated form.

2. A system as set forth in claim 1, wherein said hydrodynamic section includes a series of decks of reversely inclined stator plates to cause the medium emerging from the output of said chamber to move first in one direction and then in the reverse direction before entering said aerodynamic flow converter section, thereby to produce a centrifugal action causing particles in said wet medium to impinge on said stator plates and to adhere thereto.

3. A system as set forth in claim 2, wherein the stator plates in said series of decks are of progressively increasing angle in order to slow down the motion of the medium before it enters the aerodynamic flow converter section.

4. A system as set forth in claim 1, wherein the electrostatic precipitator is constituted by concentric collector electrodes defining a concentric flow passage in which said discharge electrode is disposed, and said vanes in said flow converter sections are disposed in an annular array about a central core, the vanes being radially disposed with respect to said core.

5. A sytem as set forth in claim 4, wherein the pleats in said first portion of the vanes are wedge-shaped and taper inwardly in the direction of the core.

References Cited by the Examiner

UNITED STATES PATENTS

| | | | |
|---|---|---|---|
| 2,273,194 | 2/1942 | Hedberg et al. | 55—8 |
| 2,587,416 | 2/1952 | Vedder | 55—416 X |
| 2,639,781 | 5/1953 | Savitz | 55—138 X |
| 2,740,493 | 4/1956 | Wintermute | 55—122 X |
| 2,756,842 | 7/1956 | Chamberlin et al. | 55—8 |
| 2,937,709 | 5/1960 | De Seversky | 55—119 |
| 3,149,936 | 9/1964 | Rich | 55—114 |

HARRY B. THORNTON, *Primary Examiner.*

D. TALBERT, *Assistant Examiner.*